United States Patent
Kagoshima et al.

(10) Patent No.: US 7,728,449 B2
(45) Date of Patent: Jun. 1, 2010

(54) HYBRID WORKING MACHINE

(75) Inventors: Masayuki Kagoshima, Hiroshima (JP); Masayuki Komiyama, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 421 days.

(21) Appl. No.: 11/860,019

(22) Filed: Sep. 24, 2007

(65) Prior Publication Data
US 2008/0093864 A1    Apr. 24, 2008

(30) Foreign Application Priority Data
Oct. 20, 2006   (JP) .............................. 2006-286823

(51) Int. Cl.
*F02C 9/00* (2006.01)
*B06D 21/00* (2006.01)
(52) U.S. Cl. ................................. 290/40 C; 180/65.2
(58) Field of Classification Search ................. 290/4 R, 290/4 D, 40 C, 40 B; 180/65.2, 65.4; 60/431
See application file for complete search history.

(56) References Cited

U.S. PATENT DOCUMENTS

| | | | |
|---|---|---|---|
| 6,199,307 B1 * | 3/2001 | Kagoshima et al. ........... 37/443 |
| 6,635,973 B1 * | 10/2003 | Kagoshima et al. ......... 307/10.1 |
| 6,666,022 B1 | 12/2003 | Yoshimatsu et al. |
| 6,789,335 B1 * | 9/2004 | Kinugawa et al. ............. 37/348 |
| 6,851,207 B2 * | 2/2005 | Yoshimatsu .................. 37/348 |
| 7,069,673 B2 * | 7/2006 | Kagoshima et al. ........... 37/348 |
| 7,279,801 B2 * | 10/2007 | Kagoshima ............... 290/40 C |
| 7,487,023 B2 * | 2/2009 | Komiyama et al. ........... 701/50 |
| 7,525,206 B2 * | 4/2009 | Kagoshima et al. ....... 290/40 C |
| 2007/0214782 A1 * | 9/2007 | Komiyama et al. ........... 60/431 |
| 2008/0093864 A1 | 4/2008 | Kagoshima et al. |

OTHER PUBLICATIONS

U.S. Appl. No. 12/581,299, filed Oct. 19, 2009, Kagoshima, et al.

* cited by examiner

*Primary Examiner*—Nicholas Ponomarenko
(74) *Attorney, Agent, or Firm*—Oblon, Spivak, McClelland, Maier & Neustadt, L.L.P.

(57) ABSTRACT

The present invention is to drive a hydraulic pump and a generator motor by an engine, electrically charge a battery by a generator operation of the generator motor, and assist the engine through driving the generator motor by electric power of the battery. On the premise of the configuration above, when a deviation between a target rotation speed of the engine and an actual rotation speed of the engine is equal to or more than a preset value, and when a residual amount of fuel is equal to or less than a preset value, it is considered to be engine failure or an operation state which is directly connected to the engine failure and an engine assisting action is automatically stopped.

3 Claims, 2 Drawing Sheets

HYBRID WORKING MACHINE

BACKGROUND OF THE INVENTION

1. Field of the Invention

The present invention relates to a hybrid working machine using both engine power and electric power.

2. Description of the Related Art

The related art will be described taking an excavator which is a preferred example of the present invention as an example.

The excavator is, as shown in FIG. 3, formed by rotatably mounting an upper rotating body 2 on a crawler type lower traveling body 1 and attaching a working attachment 3 to the upper rotating body 2.

The working attachment 3 is formed of a boom 4 capable of raising and lowering, an arm 5 attached to an edge of the boom 4, a bucket 6 attached to an edge of the arm 5, and a boom cylinder 7, an arm cylinder 8 and a bucket cylinder 9 which are hydraulic actuators for driving the boom, the arm and the bucket.

As a rotation actuator for rotating the upper rotating body 2, a hydraulic motor and a rotation motor serving as an electric actuator are used in the case of a hydraulic excavator and in the case of a hybrid excavator respectively.

The hybrid excavator having a driving mode of so called a parallel type is known (refer to Japanese Patent Laid-Open No. 2001-12274).

In this type, a hydraulic pump and a generator motor for performing a generator operation and a motor operation are connected in parallel to an engine serving as a common power source, and a hydraulic actuator is driven by the hydraulic pump. Meanwhile, a rotation motor is driven by the generator operation of the generator motor or an electric storage device.

The electric storage device is electrically charged by the generator operation of the generator motor. The generator motor timely performs the motor operation by discharge power of the electric storage device so as to assist the engine.

For example, in a machine in which engine speed sensing (ESS) control is performed, in correspondence with reduction in rotation speed of the engine, the assist control for controlling assisting force is performed in addition to power reducing control of the pump.

Irrespective of the ESS control, at the time of high load imposed, that is when only the engine is not enough to impose the load, there is a case where a shortage thereof is supplemented by an assisting action.

As mentioned above, in the hybrid excavator in which the generator motor performs the engine assisting action, the assist control is performed without any conditions other than assist conditions such as the rotation speed of the engine and the load. Therefore, even in the case where the assisting action is not required (and wasteful), that is in the case where the engine is stopped by overload or the like (engine failure) and in the case where the engine would clearly be stopped (including running out of fuel), the assisting action is still continued.

In this case, since wasteful consumption of stored power and over discharge are caused, it is not only unpreferable in view of saving energy, but also to decrease the life of the electric storage device.

SUMMARY OF THE INVENTION

It is an object of the present invention to provide a hybrid working machine capable of automatically stopping an assisting action in a state that engine assisting by a generator motor is not required.

Firstly, the hybrid working machine according to the present invention has the following basic configuration.

The present invention is a hybrid working machine, comprising a hydraulic pump for driving a hydraulic actuator, a generator motor for performing a generator operation and a motor operation, an engine for driving the hydraulic pump and the generator motor, the engine serving as a common power source therefore, an electric storage device electrically charged by the generator operation of the generator motor, the electric storage device being configured such that the generator motor is driven by electric power of the electric storage device so as to perform the motor operation for assisting the engine, controlling means for controlling an engine assisting action by the generator motor, and operation state detecting means for detecting engine failure or an operation state which is directly connected to the engine failure, wherein the controlling means stops the engine assisting action when the operation state detecting means detects the engine failure or the operation state which is directly connected to the engine failure.

According to the present invention, when the engine failure or the operation state which is directly connected to the engine failure is detected, the engine assisting action by the generator motor is automatically stopped by the controlling means. Therefore, wasteful consumption of stored power and over discharge can be prevented and it is preferable in view of the life of the electric storage device and saving energy.

The present invention is preferably configured such that the above basic configuration further comprises an engine rotation speed detecting means for detecting an actual rotation speed of the engine, the engine rotation speed detecting means serving as the operation state detecting means, wherein the controlling means determines a deviation between a target rotation speed of the engine and the actual rotation speed of the engine and stops the engine assisting action when the deviation is equal to or more than a value preset as the engine failure or a value which is directly connected to the engine failure. In the case of this configuration, the time when the deviation between the target rotation speed of the engine and the actual rotation speed of the engine is equal to or more than the preset value corresponds to the time when the engine failure or the operation state which is directly connected to the engine failure is detected as mentioned above.

The present invention is preferably configured such that the above basic configuration further comprises a fuel detecting means for detecting a residual amount of fuel, the fuel detecting means serving as the operation state detecting means, the fuel detecting means being configured to stop the engine assisting action when the residual amount of fuel is equal to or less than a value preset as the engine failure or a value which is directly connected to the engine failure. In the case of this configuration, the time when the residual amount of fuel is equal to or less than the preset value and the engine would clearly be stopped due to running out of fuel corresponds to the time when the engine failure or the operation state which is directly connected to the engine failure is detected as mentioned above.

DESCRIPTION OF THE PREFERRED EMBODIMENTS

An embodiment of the present invention will be described with reference to FIGS. 1 and 2.

Figure 1:
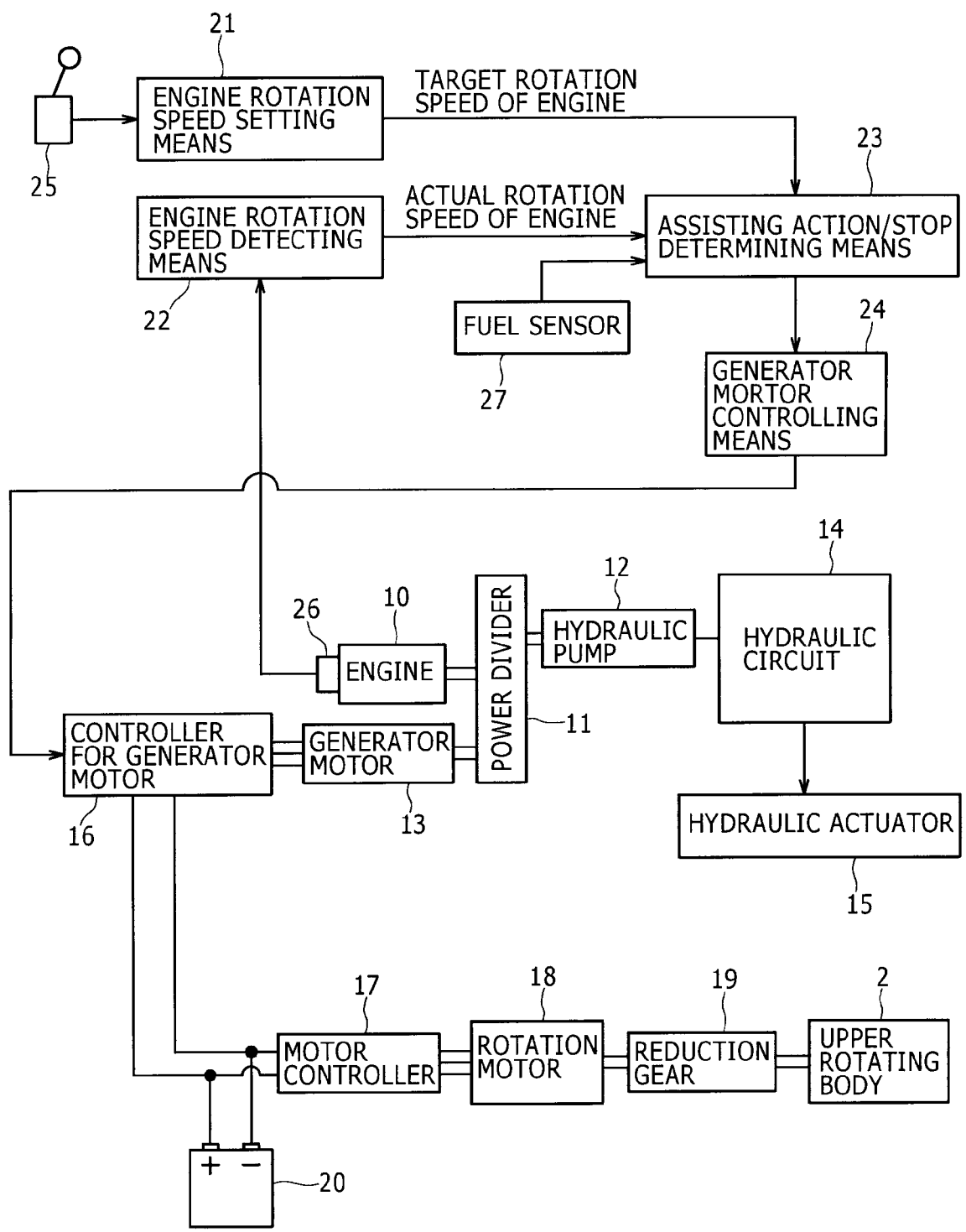
FIG. 1 is a block configuration diagram showing an embodiment of the present invention.
Figure 2:
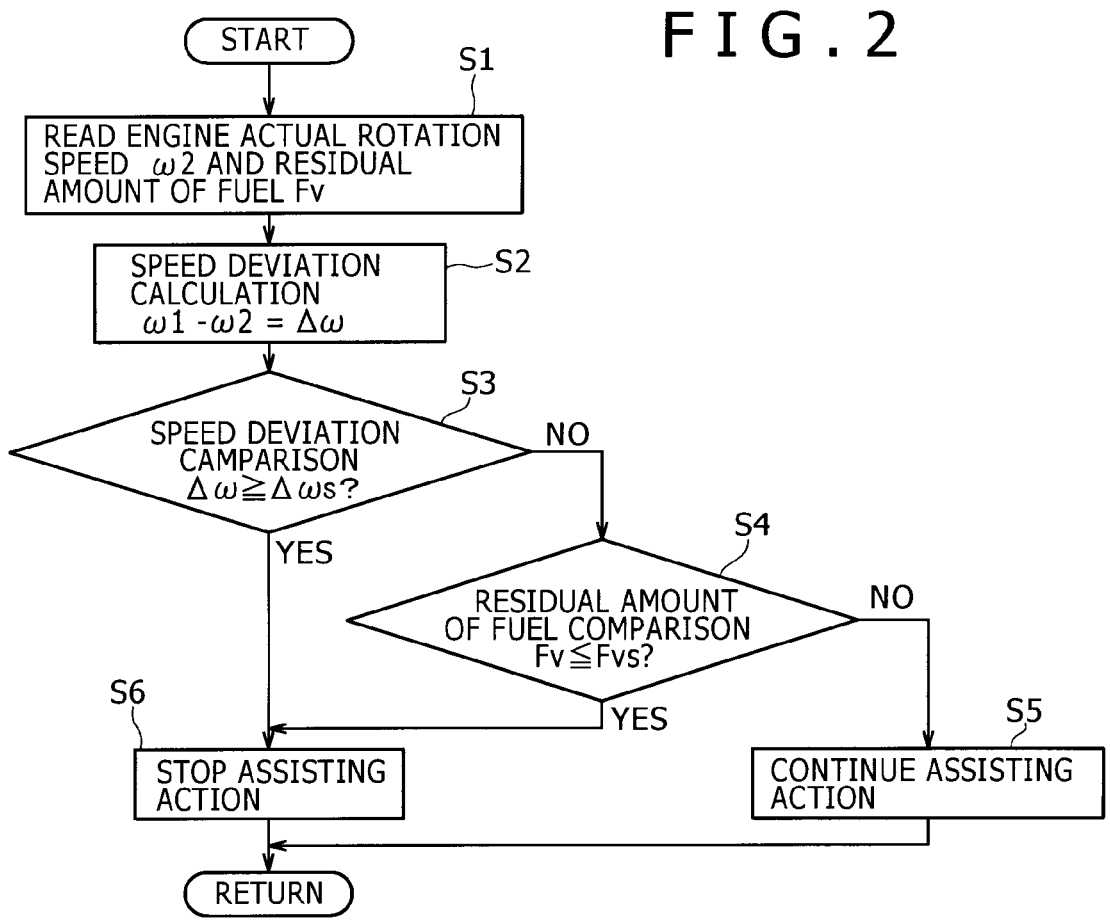
FIG. 2 is a flowchart for explaining an effect of the embodiment.

A block configuration of a hybrid excavator according to the embodiment will be shown in FIG. 1.

As shown in the figure, to an engine 10 are connected in parallel a variable capacity type hydraulic pump 12 and a generator motor 13 for performing a generator operation and a motor operation through a power divider 11. The hydraulic pump 12 and the generator motor 13 are driven by the engine 10.

Figure 3:
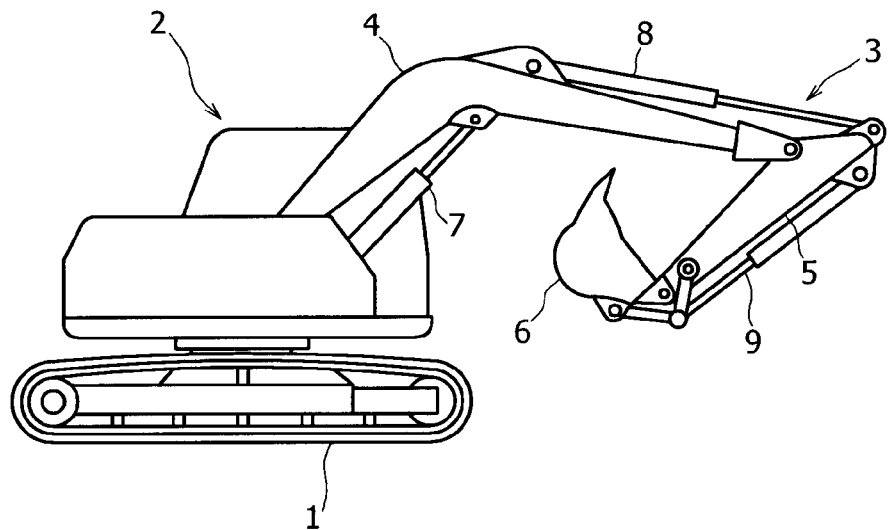
FIG. 3 is a schematic side view of an excavator which is a preferred example of the present invention.

A hydraulic circuit 14 is connected to the hydraulic pump 12, and hydraulic actuators (collectively given the reference numeral 15) including a boom cylinder 7 in FIG. 3 are driven by pressure oil from the hydraulic pump 12. It should be noted that although FIG. 1 shows the case where only one hydraulic pump 12 is connected, there is another case where a plurality of hydraulic pumps 12 are connected in parallel.

Power from the generator motor 13 is sent to a rotation motor 18 through a controller for generator motor 16 and a motor controller 17. Torque of the rotation motor 18 is sent to an upper rotating body 2 in FIG. 3 through a reduction gear 19 so as to rotate the upper rotating body 2.

Meanwhile, to the generator motor 13 is connected a battery (for example, a lithium ion capacitor) 20 serving as an electric storage device which is a second power source for the rotation motor 18 through the controller for generator motor 16.

The battery 20 is electrically charged by the generator operation of the generator motor 13. The generator motor 13 timely performs the motor operation by discharge power of the battery 20 so as to assist the engine.

For example, in a case of a hybrid excavator in which engine speed sensing (ESS) control is performed, in correspondence with reduction in rotation speed of the engine 10, the assist control is performed in addition to power reducing control of the pump.

The controller for generator motor 16 controls switching between the generator operation and the motor operation of the generator motor 13, generated electric power, and electric current or torque as the motor, and also controls charge and discharge of the battery 20 in correspondence with excess and shortage of output from the generator of the generator motor 13.

The motor controller 17 controls the electric current or the torque of the rotation motor 18.

As controlling means for controlling the engine assisting action by the battery 20 and the generator motor 13, are provided engine rotation speed setting means 21, engine rotation speed detecting means 22, assisting action/stop determining means 23 and generator motor controlling means 24.

The engine rotation speed setting means 21 sets a target rotation speed of the engine on the basis of an operation amount of a throttle 25, and sends the target rotation speed of the engine to the assisting action/stop determining means 23.

The engine rotation speed detecting means 22 detects (calculates) an actual rotation speed of the engine 10 on the basis of a signal from an engine rotation speed sensor 26, and sends the actual rotation speed of the engine 10 to the assisting action/stop determining means 23.

The assisting action/stop determining means 23 determines a deviation between the inputted target rotation speed of the engine and the inputted actual rotation speed, determines the assisting action/stop on the basis of whether or not the deviation is equal to or more than a value preset as engine failure or a value which is directly connected to the engine failure, and sends a signal serving as a determination result to the generator motor controlling means 24.

The generator motor controlling means 24 outputs a generator motor torque command for the engine assisting to the controller for generator motor 16 when the signal for the assisting action is inputted. The generator motor controlling means 24 outputs a torque command 0 to the controller for generator motor 16 when the signal for the assisting action stop is inputted.

In the assisting action/stop determining means 23, a signal from a fuel sensor 27 for detecting a residual amount of engine fuel is inputted. When the residual amount is equal to or less than a value preset as a value which is directly connected to the engine failure, the assisting action/stop determining means 23 determines the assisting action stop.

An effect of this point will be further described with reference to FIG. 2.

In Step S1, an engine actual rotation speed $\omega 2$ is read and a residual amount of fuel Fv is read. In Step S2, a deviation $\Delta\omega$ between an engine target rotation speed $\omega 1$ and the engine actual rotation speed $\omega 2$ 2 is calculated.

In Step S3, the deviation $\Delta\omega$ and a preset value $\Delta\omega s$ are compared with each other. When the answer is NO ($\Delta\omega < \Delta\omega s$), the detected value Fv and a preset value Fvs of the residual amount of fuel are further compared with each other in Step S4.

Here, when Fv<Fvs is established (when the answer is NO=when the fuel is sufficient), it is considered to be not the engine failure or a state which is directly connected to the engine failure and hence it is determined that the assisting action is to be continued in Step S5. Then the signal for the assisting action is continuously sent to the generator motor controlling means 24 in FIG. 1.

Meanwhile, when the answer is YES ($\Delta\omega \geq \Delta\omega s$) in Step S3, and when the answer is YES (Fv$\leq$Fvs) in Step S4, it is considered to be the engine failure or the state which is directly connected to the engine failure and hence it is determined that the assisting action is to be stopped in Step S6. Then the signal for the assisting action stop is sent to the generator motor controlling means 24 in FIG. 1 as the torque command 0.

According to this control, under a situation of the engine failure or the state which is directly connected to the engine failure, the engine assisting action by the generator motor 13 is automatically stopped. Therefore, wasteful consumption of power stored in the battery and over discharge can be prevented and it is preferable in view of the life of the battery and saving energy.

It should be noted that as a variation of the operation state which is directly connected to the engine failure, a rise in pump pressure over a preset value or overheat of the engine (temperature of engine) may be detected.

Although the invention has been described with reference to the preferred embodiments in the attached figures, it is noted that equivalents may be employed and substitutions made herein without departing from the scope of the invention as recited in the claims.

We claim:

1. A hybrid working machine, comprising:
   a hydraulic pump for driving a hydraulic actuator;
   a generator motor for performing a generator operation and a motor operation;
   an engine for driving said hydraulic pump and said generator motor, the engine serving as a common power source therefor;
   an electric storage device electrically charged by the generator operation of said generator motor, the electric storage device being configured such that said generator motor is driven by electric power of the electric storage device so as to perform the motor operation for assisting said engine;

controlling means for controlling an engine assisting action by said generator motor; and operation state detecting means for detecting engine failure or an operation state which is directly connected to the engine failure, wherein said controlling means is adapted to stop the engine assisting action when said operation state detecting means detects the engine failure or the operation state which is directly connected to the engine failure.

2. The hybrid working machine according to claim 1, wherein an engine rotation speed detecting means for detecting an actual rotation speed of said engine serves as said operation state detecting means, and wherein said controlling means determines a deviation between a target rotation speed of said engine and the actual rotation speed of said engine and stops the engine assisting action when the deviation is equal to or more than a value preset as the engine failure or a value which is directly connected to the engine failure.

3. The hybrid working machine according to claim 1, wherein fuel detecting means for detecting a residual amount of fuel serves as said operation state detecting means, the fuel detecting means being configured to stop the engine assisting action when the residual amount of fuel is equal to or less than a value preset as the engine failure or a value which is directly connected to the engine failure.

* * * * *